United States Patent
Williams (10) Patent No.: US 8,215,059 B2
(45) Date of Patent: Jul. 10, 2012

(54) MODULAR GARDENING SYSTEM

(76) Inventor: R. Marc Williams, Fountain Hills, AZ (US)

( * ) Notice: Subject to any disclaimer, the term of this patent is extended or adjusted under 35 U.S.C. 154(b) by 231 days.

(21) Appl. No.: 12/814,326

(22) Filed: Jun. 11, 2010

(65) Prior Publication Data

US 2010/0313474 A1 Dec. 16, 2010

Related U.S. Application Data

(60) Provisional application No. 61/186,753, filed on Jun. 12, 2009.

(51) Int. Cl.
*A47G 7/00* (2006.01)
*A01G 9/02* (2006.01)

(52) U.S. Cl. .................................. 47/86; 47/39
(58) Field of Classification Search ............. 47/39, 65.5, 47/66.1, 66.6, 68, 86
See application file for complete search history.

(56) References Cited

U.S. PATENT DOCUMENTS

| | | | |
|---|---|---|---|
| 3,852,912 A * | 12/1974 | Diller | 47/84 |
| 4,213,271 A * | 7/1980 | Petruzzi et al. | 47/39 |
| 4,315,520 A | 2/1982 | Atkinson et al. | |
| 4,920,695 A | 5/1990 | Garden | |
| 5,001,317 A | 3/1991 | Atkinson et al. | |
| 5,354,530 A | 10/1994 | Atkinson et al. | |
| 5,358,004 A | 10/1994 | Atkinson et al. | |
| 5,400,544 A | 3/1995 | Wien | |
| 5,555,675 A | 9/1996 | Whisenant | |
| 5,595,209 A | 1/1997 | Atkinson et al. | |
| 5,653,264 A | 8/1997 | Atkinson | |
| 5,661,278 A | 8/1997 | Atkinson et al. | |
| 6,305,415 B1 | 10/2001 | Atkinson et al. | |
| 6,332,287 B1 | 12/2001 | Geraldson | |
| 6,434,882 B1 | 8/2002 | Becker | |
| 6,612,073 B1 | 9/2003 | Powell et al. | |
| 6,840,008 B1 | 1/2005 | Bullock et al. | |
| 6,895,712 B2 * | 5/2005 | Gunderman et al. | 47/39 |
| 6,907,693 B1 | 6/2005 | Bemben | |
| 6,993,869 B2 | 2/2006 | Waters | |
| 7,059,367 B2 | 6/2006 | Atkinson et al. | |
| 7,159,358 B2 | 1/2007 | Yawney et al. | |
| 7,634,871 B2 | 12/2009 | DiPaolo et al. | |
| 7,735,800 B2 * | 6/2010 | Lunato et al. | 248/558 |
| 2003/0089032 A1 * | 5/2003 | Gunderman | 47/39 |
| 2004/0055212 A1 * | 3/2004 | Ritter | 47/39 |
| 2005/0229487 A1 | 10/2005 | Whisenant | |
| 2006/0005467 A1 | 1/2006 | Washburn | |
| 2006/0179712 A1 | 8/2006 | Maniscalco et al. | |
| 2008/0092442 A1 | 4/2008 | Singer | |

* cited by examiner

*Primary Examiner* — Monica Williams
(74) *Attorney, Agent, or Firm* — Alleman Hall McCoy Russell & Tuttle LLP

(57) ABSTRACT

A modular gardening system includes a first monolithic growing pod forming an interior growing volume and including an opening to the growing volume defined by a frame-accommodating lip, and at least a second monolithic growing pod, the second monolithic growing pod being substantially identical to the first monolithic growing pod. The modular gardening system further includes a frame assembly configured to form a perimeter around the opening of the first monolithic growing pod within the frame-accommodating lip of the first monolithic growing pod and the opening of the second monolithic growing pod within the frame-accommodating lip of the second monolithic growing pod, the frame assembly further configured to support the first monolithic growing pod and the second monolithic growing pod in a side-by-side array, stepped array, or elevated array.

20 Claims, 5 Drawing Sheets

MODULAR GARDENING SYSTEM

CROSS REFERENCE TO RELATED APPLICATIONS

This application claims the benefit of U.S. Provisional Patent Application No. 61/186,753, filed Jun. 12, 2009 and entitled MODULAR GARDENING SYSTEM, the entirety of which is hereby incorporated by reference for all purposes.

BACKGROUND

Gardening is an enjoyable and cost effective endeavor that is becoming increasingly popular with people of all ages. Furthermore, people in urban settings or other areas not conventionally thought to be ideal for gardening are continuing to take up gardening as a way to reduce stress, increase healthy eating habits, reduce food costs, and grow fresh, organic foods.

Despite the desire to begin gardening, many potential gardeners never plant the first seed because of the perceived complexity with starting a healthy and productive garden and/or the lack of significant produce production when using smaller gardening units. This perceived complexity can be a particularly troubling obstacle for potential gardeners that are of advanced age, face physical challenges, and/or live in urban settings without ample room or suitable soil conditions for conventional garden beds.

SUMMARY

Accordingly, a modular gardening system is disclosed. In one example, the modular gardening system includes a first monolithic growing pod, which forms an interior growing volume and includes an opening to the growing volume defined by a frame-accommodating lip, and a plant growing medium occupying at least part of the growing volume of the first monolithic growing pod. The modular gardening system further includes at least a second monolithic growing pod, which forms an interior growing volume and includes an opening to the growing volume defined by a frame-accommodating lip, the second monolithic growing pod being substantially identical to the first monolithic growing pod, and a plant growing medium occupying at least part of the growing volume of the second monolithic growing pod. The modular gardening system further includes a frame assembly configured to run around the opening of the first monolithic growing pod within the frame-accommodating lip of the first monolithic growing pod and the opening of the second monolithic growing pod within the frame-accommodating lip of the second monolithic growing pod. The frame assembly is further configured to support the first monolithic growing pod and the second monolithic growing pod in a side-by-side array, a stepped array, or an elevated array.

DETAILED DESCRIPTION

It is to be understood that the modular gardening system described herein is exemplary in nature, and that this specific embodiment is not to be considered in a limiting sense, because numerous variations are possible. The subject matter of the present disclosure includes all novel and nonobvious combinations and subcombinations of the various components, accessories, configurations, and other features, and/or properties disclosed herein, as well as any and all equivalents thereof. While the various components and features are described with reference to each other, it is to be understood that individual components feature novel and nonobvious aspects independently. As such, all the components described herein are not necessarily required in all embodiments. Furthermore, any particular component may be substituted with a functionally equivalent component without departing from the spirit of this disclosure.

Figure 1:
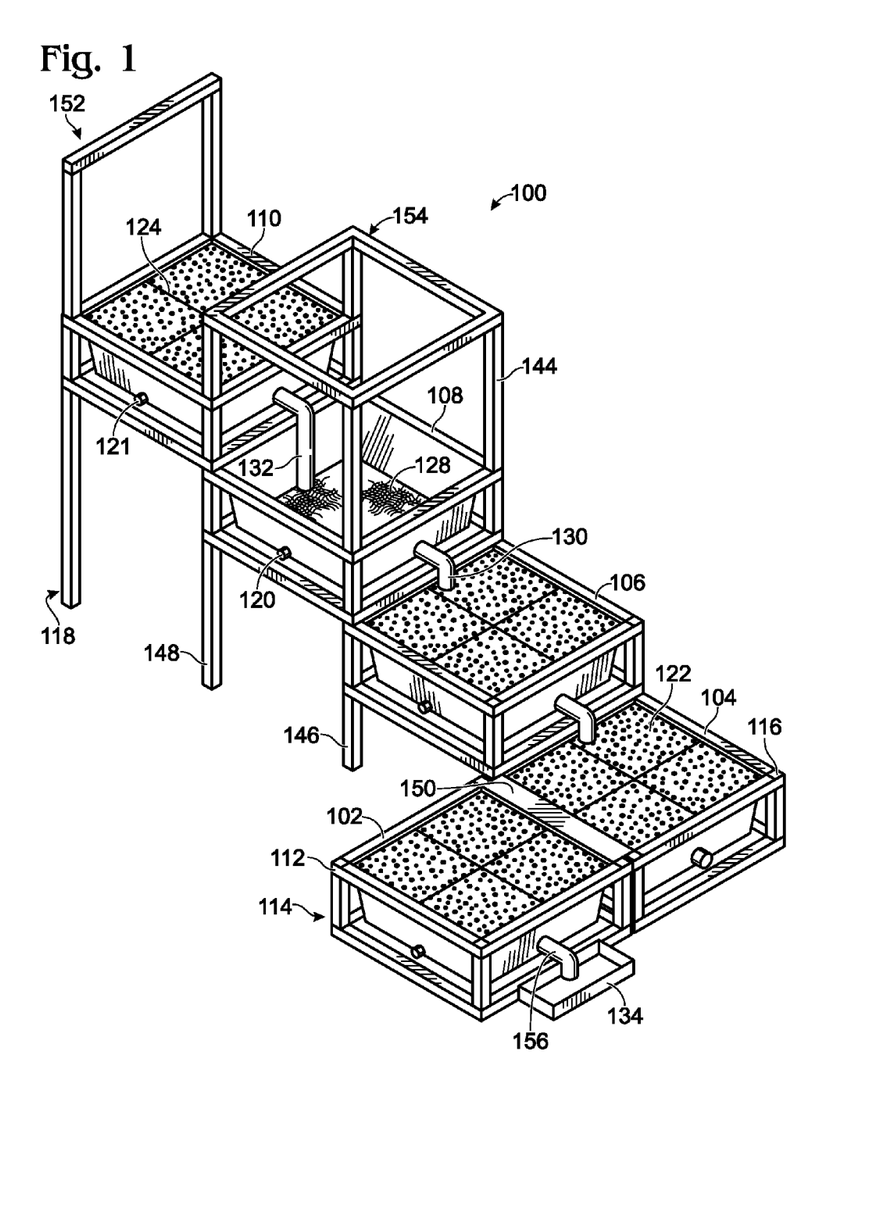
FIG. 1 shows a modular gardening system including an array of monolithic growing pods in accordance with an embodiment of the present disclosure.

FIG. 1 illustrates an example modular gardening system 100. In the example of FIG. 1, a plurality of monolithic growing pods is shown in a combination of side-by-side, stepped, and elevated arrays. As shown, each of the five monolithic growing pods 102, 104, 106, 108, and 110 in the modular gardening system 100 is substantially identical. However, in some embodiments the monolithic growing pods may be differently sized and/or shaped relative to one other. In such embodiments, the monolithic growing pods may all have the same height, thus facilitating modular stacking, stepping, and elevation.

Each monolithic growing pod is a single seamless unit. As such, portability, stability, and versatility are improved over conventional raised garden beds that are formed of four boards with corner connecting mechanisms that may or may not be attached to a bottom, for example. Further, each monolithic growing pod may be made of a waterproof material. For example, each growing pod may be made of plastic that is vacuum formed or injection molded, for example. As other examples, each growing pod may be formed of engineered wood (e.g., wood particles and/or fibers) or engineered cellulosic material (e.g., vegetable fibers). As such, fluids such as water used to water plants growing in the growing pods may be contained within the growing pods without leakage.

Figure 2:
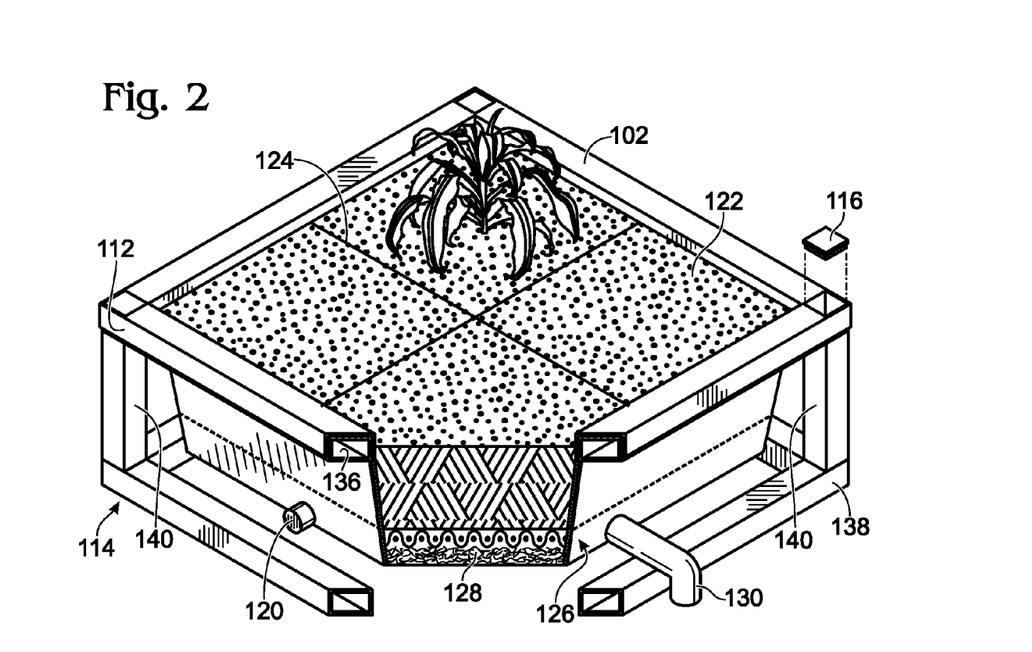
FIG. 2 shows a monolithic growing pod in a frame assembly in accordance with an embodiment of the present disclosure.

In the example embodiment depicted in FIG. 2, each monolithic growing pod includes four sides and a bottom forming an interior growing volume. In the illustrated embodiment, a cross-section through the sides of each growing pod has a substantially square shape. Further, the sides of each growing pod are slanted with respect to the vertical direction such that the cross-sectional area of the square decreases with increasing depth in the growing pod. As an example, each growing pod may be 24 inches by 24 inches at the top and 22 inches by 22 inches at the bottom and have a depth of 8 inches. In some embodiments, including embodiments employing a porous barrier, each pod may have a depth of up to 12 inches. In this manner, the monolithic growing pods may be stacked (e.g., nested within each other) for storage and/or for shipping the modular gardening system to a customer, for example. In other embodiments, the cross-sectional shape of each monolithic growing pod may be rectangular or elliptical, for example.

Further, an opening to the interior growing volume (e.g., the top of each growing pod) is defined by frame-accommodating lip 112. As shown most clearly in FIGS. 2 and 5*b*, frame-accommodating lip 112 has an L-shape and extends from the top of the sides of each growing pod along the horizontal direction forming a channel around the top of each growing pod. For example, frame-accommodating lip 112 may form a 1 inch border around the top of each monolithic growing pod. Furthermore, frame-accommodating lip 112 sits on the frame assembly 114, as will be described in greater detail below. As shown, frame-accommodating lip 112 includes perforated areas 116 at each corner of the growing pod. The perforated areas 116 may be removed for insertion of a leg into frame assembly, as will be described in more detail below.

Each monolithic growing pod further includes at least two drainage ports 120 for draining excess water. In some examples, the drainage ports may be used in a continuous drainage system in an array of growing pods such that the growing pods are fluidically coupled, as will be described in more detail below. In the embodiments shown in FIGS. 1 and 2, each growing pod 102, 104, 106, 108, and 110 has four drainage ports—one drainage port located on each side of the growing pod. Each drainage port 120 is positioned within a level of a drain field (e.g., ½ inch above the bottom of the growing pod). As such, the drainage port may remain unclogged by a growing medium occupying the growing pod, for example, as will be described in greater detail below. Further, each drainage port may have a circular cross-section in order to facilitate coupling with a drainage pipe, which will be described in greater detail below. The drainage port 120 may extend a relatively short distance (e.g., ½ inch) away from the growing pod, as shown in FIGS. 1 and 2. In other examples, the drainage port may extend into the growing pod or not extend from the growing pod at all. It is to be understood, the embodiments described above are merely examples, and the numbering, positioning, and shape of the drain port may have any suitable configuration.

FIG. 2 shows a schematic diagram of example monolithic growing pod 102 with one of its corners cut away such that a cross-section of the interior of the pod is visible. As shown, part of the interior growing volume of growing pod 102 is occupied by plant growing medium 122. In some examples, plant growing medium 122 may be soil or a mixture of soil and compost, for example. In other examples, plant growing medium 122 may be a natural fiber such as coco peat, which may be compressed and dehydrated for shipping, and then reconstituted to fill the growing pod by adding water.

Further, grid-guide 124 is positioned on top of growing medium 122 as shown in FIGS. 1 and 2. Grid-guide 124 is configured to demarcate a division of monolithic growing pod 102 into growing subdivisions having the same size. For example, if the opening of monolithic growing pod 102 is 2 feet by 2 feet, grid-guide 124 may divide growing pod 102 into four square foot quadrants. In some embodiments, grid-guide 124 may consist of two dividers that snap together in the center. In such an embodiment, the grid-guide may be easily disassembled for storage and/or shipping. Further, in some embodiments, the grid-guide may rest in notches formed in frame-accommodating lip 112. In other embodiments, the grid-guide may be attached to the growing pod. Although an example of two dividers is used herein, it is to be understood the grid-guide may consist of any suitable number of dividers based on the dimensions of the growing pod and the desired size and number of segments.

As further shown in FIG. 2, monolithic growing pod 102 includes a drain field 126 occupying the interior growing volume below plant growing medium 122. For example, drain field 126 may occupy the bottom inch of the growing pod. In the example of FIG. 2, drain field 126 includes a layer of porous material 128. The porous material may have a thickness of 1 inch, for example. The porous material may be more permeable to water and air than to plant growing medium 122. In some embodiments, the porous material may be substantially impermeable to plant growing medium 122. In some examples, the porous material may be a non-woven plastic mesh. In other examples, the porous material may be a natural fiber such as coir, which is fiber extracted from the outer shell of a coconut. Thus, plant growing medium 122 remains above drain field 126 and excess water may be drained away from plant growing medium 122. Further, as stated above, drainage ports 120 are positioned within the level of drain field 126. As such, excess water in drain field 126 may be drained from growing pod 102 such that the excess water level does not reach the level of plant growing medium 122.

Figure 3A:
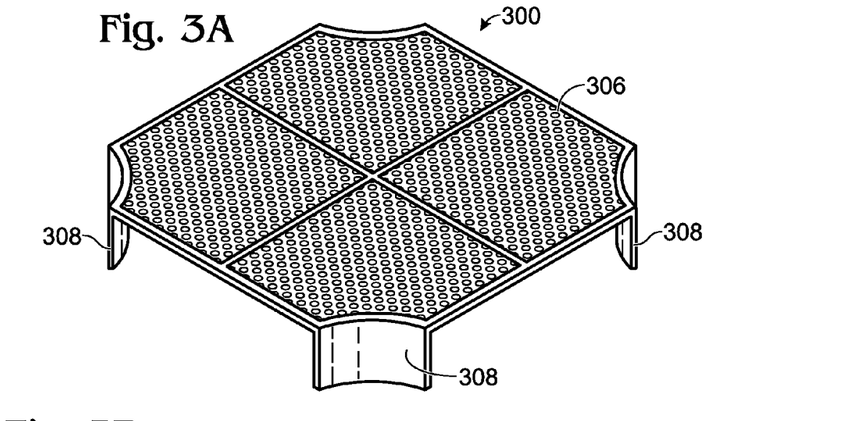
FIGS. 3A and 3B show a porous barrier that divides an interior growing volume of a monolithic growing pod in accordance with an embodiment of the present disclosure.
Figure 3B:
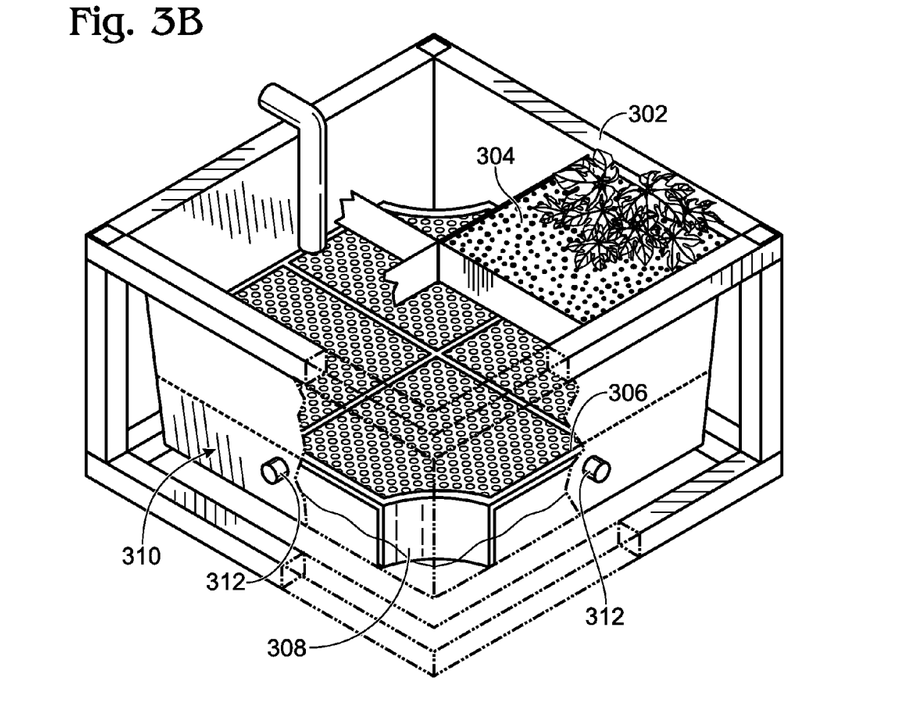

FIGS. 3A and 3B show examples of an alternate embodiment of the drain field. FIG. 3A shows a porous barrier 300 that may be placed in the interior growing volume of monolithic growing pod 302. In some examples, porous barrier 300 may be formed of plastic, such as the same plastic the growing pod is made of for example, and the plastic may be perforated such that air and water may pass through porous barrier 300 while growing medium 304 is substantially confined above porous barrier 300. As shown in FIG. 3A, porous barrier 300 may have a table-like shape such that flat surface 306 is parallel to the bottom of growing pod 302 and spaced a distance (e.g., 3 inches) from the bottom of growing pod 302 by legs 308. In such an example, drain field 310 of monolithic growing pod 302 may occupy the bottom 3 inches of the growing pod, for example. Further, in the configuration shown in FIG. 3B, monolithic growing pod 302 may be deeper (e.g., 12 inches) than that in the configuration shown in FIG. 2 (e.g., 8 inches). Flat surface 306 may have substantially the same shape as the cross-section of growing pod 302. In the example of FIGS. 3A and 3B, flat surface 306 may be shaped such that the corners are cut way allowing growing medium 304 to fall below the level of flat surface 306 in the interior growing volume. Further, as shown in FIGS. 3A and 3B, legs 308 may be made of the same porous material as flat surface 306, and may be curved such that they contact the sides of growing pod 302. As such, growing medium 304 occupies only part of the interior growing volume in the level of drain field 310 in the corners of growing pod 302 and the remainder of the interior growing volume in the level of drain field 310 may only be occupied by air and water. In other examples, the legs may be positioned along the sides of the growing pod instead of at the corners. As another example, the legs may form hollow cylinders positioned towards the center of the flat surface. It is to be understood, the embodiments described above are merely examples, and the numbering, positioning, and shape of the legs and flat surface may have any suitable configuration.

In such a configuration, drain ports 312 may be positioned at a higher level (within the level of the drain field) than in the example where a porous material occupies the interior growing volume in the drain field. As such, water may be stored in the drain field and growing medium 304 may have a continuous supply of water for as long as there is water stored in drain field, for example, via the process of capillary action. This may increase the convenience of using the modular gardening system by reducing the number of times plants growing in the monolithic growing pods need to be watered, for example.

Continuing with FIG. 1, modular gardening system 100 further includes a continuous drainage system which fluidically couples the monolithic growing pods. As shown, drainage pipes are operatively coupled to the drainage outlets of each monolithic growing pod 102, 104, 106, 108, and 110. In some examples the drainage pipes may be made of the same material as the growing pods, for example. In other examples, the drainage pipes may be another suitable material for transporting fluids.

Further, in some examples, the drainage outlets may be female receptors for the drainage pipes. As shown in FIG. 2, a drainage pipe can be a straight length of pipe (e.g., 6 inches), which may couple a first monolithic growing pod and a second monolithic growing pod in a side-by-side array. Two drainage pipes may be coupled together by an elbow in order to create a pipe that is bent at a substantially 90 degree angle, such as drainage pipe 130 shown in FIG. 2. Drainage pipe 130 may be used in a stepped array, as shown in FIG. 1, to drain excess water from a first monolithic growing pod into a second monolithic growing pod that is lower in height than the first growing pod thereby watering the plants in the second growing pod. Further, excess water may be piped directly to the level of the drain field. As an example, as shown in FIG. 1, drainage pipe 132 extends into growing pod 108, and through growing medium (not shown in growing pod 108), to the top of porous material 128. In the example of FIG. 3B, the drainage pipe extends through the growing medium to the top of porous barrier 300. In some embodiments, a porous barrier may be shaped to accommodate a drainage pipe that empties below the upper level of the porous barrier. Drainage pipe 156 may further be used to drain excess water from the growing pod into drainage collector 134, as shown in FIG. 1. Drainage collector 134 may be made of the same waterproof material as the growing pods and/or drainage pipes, for example. In some examples, drainage collector 134 may be used to store water for future watering of the modular gardening system. In some embodiments, O-rings (not shown) may be placed on either end of a drainage pipe in order to seal the drainage port and reduce a possibility of water leaking from the drainage port.

In other examples, the drainage pipe may have a diameter such that it may pass through the drainage port. In such an example, the drainage pipe may include a shield (e.g., molded to the drainage pipe) to stop the drainage pipe from being placed too far inside the growing pod. Further, the end of the drainage pipe may include a threaded portion such that the drainage pipe may be secured in position by a nut on the inside of the growing pod. O-rings may be placed on the drainage pipe between the growing pod and the shield and between the growing pod and the nut in order to seal the drainage port from leakage, as described above.

In still other examples, the drainage pipe may have any suitable configuration for fluidically coupling one growing pod to another growing pod.

Further, because not every drainage port may be adjacent to another growing pod or desired for use in the drainage system, each drainage port may be sealed with plug 121, for example, that may be removed if desired. In some embodiments, the plug may be replaced if the user changes the configuration of the array of growing pods.

As depicted in FIGS. 1 and 2, each monolithic growing pod is supported by a frame assembly. FIG. 2 shows a more detailed view of frame assembly 114 supporting growing pod 102. In general, a frame assembly is configured to hold a growing pod in a fixed position relative to one or more other growing pods. In some embodiments, frame assembly 114 may be made of a metal material such as aluminum, steel, or stainless steel, for example. In some examples, frame assembly 114 may be made of a composite material such as engineered wood or a hard plastic material. However, it is to be understood that the frame assembly may be made of any material that is strong enough to hold a growing pod in a fixed position relative to other growing pods. Further, as shown, frame assembly 114 may be hollow. In such an embodiment, the total weight of the modular gardening system is reduced.

As shown in FIG. 2, frame assembly 114 is configured such that top portion 136 of the frame forms a perimeter around the opening of the interior growing volume within frame-accommodating lip 112. Thus, frame-accommodating lip rests on top portion 136 of frame assembly 114 and the top portion 136 of frame assembly 114 substantially fills the channel formed by frame-accommodating lip 112.

Frame assembly 114 further includes bottom portion 138 that is substantially parallel to and spaced a distance below (e.g., the distance is equal to the height of the growing pod) the top portion. Bottom portion 138 includes a perimeter portion that is substantially identical to the perimeter formed by the top portion. Further, the perimeter portion of bottom portion 138 may optionally include notches (not shown) for accommodating drainage pipes that may be coupled to one or more of the drainage ports of monolithic growing pod 102. Bottom portion 138 may further include cross members extending from one side of the perimeter portion to the opposite side to support the weight of growing pod 102.

Further, frame assembly 114 further includes middle portion. The middle portion includes two or more hollow pillars 140 configured to join top portion 136 and bottom portion 138. In some embodiments, the user may receive frame assembly 114 as a single unit (e.g., top portion 136 and bottom portion 138 are welded or attached in another suitable manner to pillars 140 for example). In other embodiments, the user may receive frame assembly 114 in several pieces that are configured to be assembled by the user. Pillars 140 may be hollow. For example, a cross-sectional area of the opening of pillar 140 may be substantially equal to perforated area 116 in frame-accommodating lip 112. As such, legs may be inserted into the top (when perforated area 116 is removed) or bottom of a pillar in order to increase the height of monolithic growing pod 102, to create a stepped array, an elevated array, or to add a frame above a monolithic growing pod, as shown in FIG. 1 and as will be described below.

Figure 4:
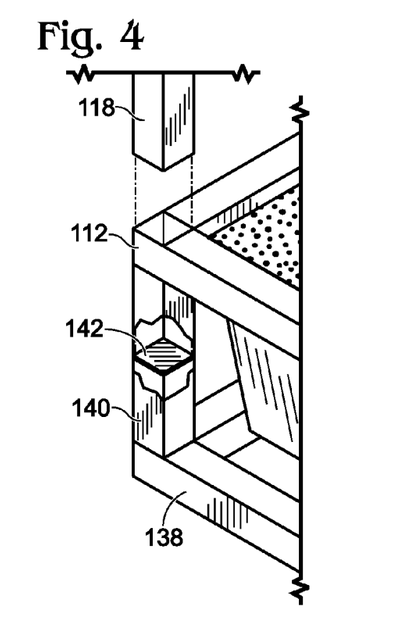
FIG. 4 somewhat schematically shows a modular frame assembly in accordance with an embodiment of the present disclosure.

As depicted in FIG. 4, each pillar 140 includes stopper 142. Stopper 142 may be made of the same material as frame assembly 114, for example, and may be molded into pillar 140. In other examples, stopper 142 may be another material such as rubber, for example, that is put in place after pillar 140 is formed. As shown, stopper 142 is positioned in the middle of pillar 140. In this manner, legs may be inserted a substantially equal distance into the top and bottom of each pillar 140.

In other embodiments, each monolithic growing pod may include an integrated support structure instead of the frame assembly described above. For example, the pillars described above may be integrated into the side walls of each monolithic growing pod (e.g., in each corner of a square or rectangular growing pod). As such, legs may be mated to each growing pod to create a stepped and/or elevated array without the use of a separate frame assembly.

As shown in FIG. 1, modular gardening system 100 further includes a modular leg structure. The modular leg structure provides a plurality of legs 118 which are inserted into the hollow pillars of the frame assembly (as shown in FIG. 4). Legs 118 may be made of any suitable material, such as the same material as frame assembly 114, for example. Further, as with frame assembly 114, legs 118 may be hollow in order to reduce a total weight of the modular gardening system. Legs 118 may have a cross-sectional area that is slightly smaller than the cross-sectional area of the opening of pillar 140 such that leg 118 may be snugly inserted into pillar 140. Further, legs 118 of varying length (e.g., 12 inches, 20 inches, 28 inches, and 36 inches) may be included with the gardening system thereby allowing the user to raise the modular gardening system to a desired height.

In the example of FIG. 1, legs 144 of one length are mated to (e.g., inserted in) the top portion of one side of a first frame assembly supporting growing pod 108 and the bottom portion of one side of a second frame assembly supporting growing pod 106 to form a stepped array. Further, legs 148 of a greater length are inserted into the other side of the bottom portion of the second frame assembly supporting growing pod 108 in order to raise the other side to the same height.

Figure 5A:
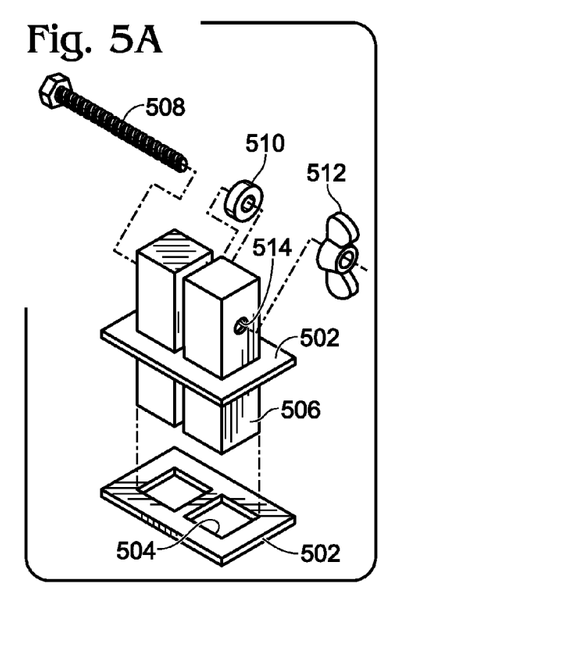
FIGS. 5A and 5B somewhat schematically show example connector clips in accordance with an embodiment of the present disclosure.

In some embodiments, two or more growing pods may be raised to the same height with eight matching legs in a side-by-side array. In such an embodiment, adjacent legs may be held together via a connector clip, such as figure-eight leg clip 502 shown in FIG. 5A. As shown in the illustrated embodiment, figure-eight leg clip 502 includes two openings 504 through with two adjacent legs 506 are inserted. Openings 504 of figure-eight leg clip 502 have a cross-sectional area that is slightly larger than the cross-sectional areas of legs 506 such that figure-eight leg clip 502 fits snugly over legs 506. Further, figure-eight leg clip 502 may be made of rubber, for example, in order to prevent figure-eight leg clip 502 from slipping and/or sliding down legs 506. As another example, two legs may be held together via bolt 508, spacer 510, and wing nut 512, as shown in FIG. 5A. In the embodiment illustrated in FIG. 5A, bolt 508 is inserted through holes 514 in each leg and secured in place by wing nut 512, while spacer 510 maintains a distance between the two legs. In some embodiments, a figure-eight leg clip may be used and a bolt, spacer, and wing nut may be used, as shown in FIG. 5A. In other embodiments, a figure-eight leg clip may be used or a bolt, spacer, and wing nut may be used. In still other embodiments, an E-clip (not shown) may be used. In such an embodiment, the E-clip may connect from the back of the legs, for example.

Figures 5B, 6:
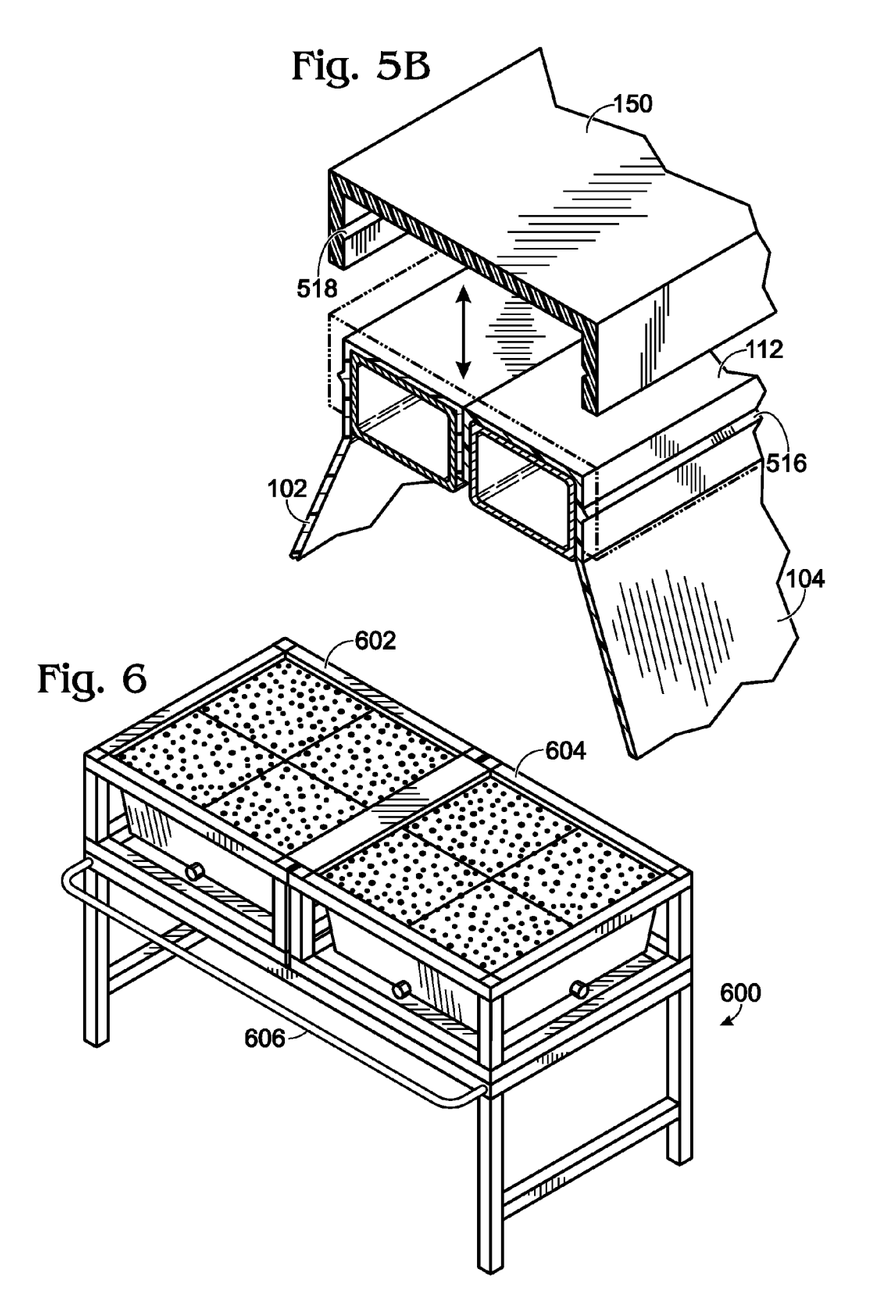
FIG. 6 shows a modular gardening system including a handrail in accordance with an embodiment of the present disclosure.

Furthermore, in a side-by-side array, adjacent monolithic growing pods 102 and 104 may be joined by connector clip 150 shown in FIG. 5B (and also shown in FIG. 1). As shown in the embodiments illustrated in FIGS. 1 and 6, connector clip 150 fits over two side-by-side frame-accommodating lips and extends the length of the growing pod. As shown in FIG. 5B, the inside of each growing pod 102 and 104 may include raised ridge 516 for mating with recessed portion 518 of connector clip 150 thereby holding connector clip 150 in place. Connector clip 150 may be made of any suitable material, such as the same material as the monolithic growing pods.

Legs may further be connectable to each other. For example, inserted in the top portion of a frame assembly to form a frame above the monolithic growing pod. In particular, at 152 in FIG. 1, two legs are mated to one side of growing pod 110 and a third leg connects the top of the two legs. In such a configuration, the three legs may be used as a frame for trellis netting for vining plants, for example. In another example, at 154 in FIG. 1, eight legs are coupled to create top frame above monolithic growing pod 108. In such a configuration, the top frame may be used as a support for a screen, for example, to prevent pests from eating plants growing in the growing pod. As another example, the top frame may be used to support a cover (e.g., shade cloth, cold frame, glass table surface, etc.) for protecting plants from cold and/or rainy weather and/or for turning the top of the garden into a table, for example.

Further, as shown in FIG. 6, legs may be part of table assembly kit 600 that supports two or more side-by-side monolithic growing pods 602 and 604. In such an example, table assembly kit 600 may increase the height of growing pods 602 and 604 (e.g., 36 inches) to a predetermined height such that it meets standards of the Americans with Disabilities Act (ADA). Table assembly kit 600 may further include handrail 606 that meets ADA standards thereby providing all gardeners, in particular gardeners with physical challenges, with increased comfort and confidence while gardening. In some embodiments, table assembly kit 600 may include leg stubs (not shown) protruding from the top of the table, for example. The leg stubs may be inserted into the bottom of the frame assemblies supporting monolithic growing pods in order to secure the growing pods from lateral movement while on top of the table. A table assembly may optionally include fasteners for securing the table to a supporting surface, and/or leg weights to decrease the chance of the table assembly being tipped over by a user gripping handrail 606. The table assembly may provide at least 27 inches of horizontal clearance, thus accommodating wheel chair access.

Figure 7:
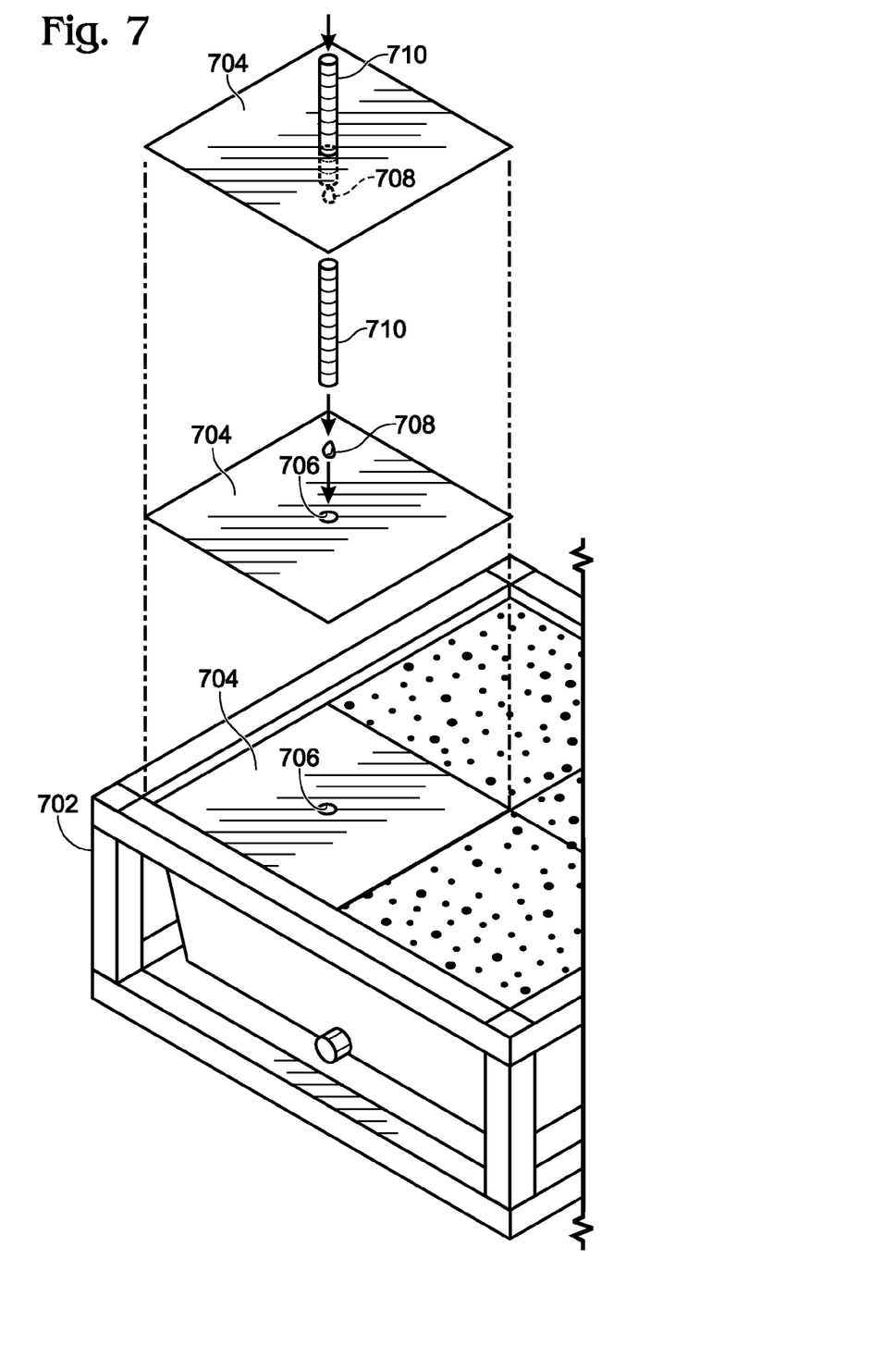
FIG. 7 shows a modular gardening system including a planting template in accordance with an embodiment of the present disclosure.

In the embodiment of FIG. 7, monolithic growing pod 702 includes a planting template 704 that may be used to assist a user in planting seeds in the growing pod. In the illustrated embodiment, planting template 704 is the size of one quadrant of the monolithic growing pod. Planting template 704 may be made of the same material as monolithic growing pod 702, for example, or another suitable material. Planting template 704 may include one or more holes 706 that are large enough for a seed to be placed in the hole. In some embodiments, the monolithic growing pod may include a plurality of planting templates each with a different number of holes appropriate for the template size and desired plant spacing pattern (e.g., 1 hole, 4 holes, 9 holes, etc.). In other embodiments, the monolithic growing pod may include one or more planting templates that may include a maximum number of perforated areas that may be removed by the user to obtain a desired number of holes based on the plants the user wishes to grow. The user may place planting template 704 over the desired quadrant of the growing pod and place a desired number of seeds 708 in the hole(s). Once the seed(s) are in place, the user may user use graduated dowel 710 to push the seed(s) into each hole to a desired depth (as indicated by marks on the graduated dowel). It will be understood the planting template shown in FIG. 7 is merely an example and the size, shape, material, and number of holes may have any suitable configuration.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:
1. A modular gardening system, comprising:
   a first monolithic growing pod forming an interior growing volume and including an opening to the interior growing volume defined by a frame-accommodating lip;
   a plant growing medium occupying at least part of the interior growing volume of the first monolithic growing pod;

at least a second monolithic growing pod forming an interior growing volume and including an opening to the interior growing volume defined by a frame-accommodating lip, the second monolithic growing pod being substantially identical to the first monolithic growing pod;

a plant growing medium occupying at least part of the interior growing volume of the second monolithic growing pod;

a frame assembly configured to run around the opening of the first monolithic growing pod within the frame-accommodating lip of the first monolithic growing pod and the opening of the second monolithic growing pod within the frame-accommodating lip of the second monolithic growing pod, the frame assembly further configured to support the first monolithic growing pod and the second monolithic growing pod in a side-by-side array, stepped array, or an elevated array;

a modular leg structure comprising a plurality of legs, the legs configured to be selectively mated to a top portion and a bottom portion of the frame assembly.

2. The modular gardening system of claim 1, wherein the monolithic growing pods are nestable within each other.

3. The modular gardening system of claim 1, further comprising a drain field occupying at least part of the interior growing volume of the first monolithic growing pod.

4. The modular gardening system of claim 3, wherein a porous material is disposed in the drain field, the porous material permeable to water and air and not permeable to the plant growing medium occupying the interior growing volume of the first monolithic growing pod.

5. The modular gardening system of claim 3, wherein a porous barrier divides the drain field and the part of the interior growing volume occupied by the plant growing medium.

6. The modular gardening system of claim 3, wherein the first monolithic growing pod and the second monolithic growing pod each include two or more drainage ports, the drainage ports positioned within a level of the drain field, and wherein the drainage ports are configured to be operatively coupled to a drainage pipe, the drainage pipe fluidically coupling the first monolithic growing pod to the second monolithic growing pod or to a drainage collector, and wherein the drainage ports are further configured to be sealed with a plug when not coupled to the drainage pipe.

7. The modular gardening system of claim 1, further comprising a connector clip configured to join the first monolithic growing pod and the second monolithic growing pod in the side-by-side array.

8. The modular gardening system of claim 1, wherein the leg structure increases a height of the first monolithic growing pod when mated to the bottom portion of the frame assembly, and forms a stepped or elevated array when mated to a top portion of a first frame assembly and a bottom portion of a second frame assembly.

9. The modular gardening system of claim 8, wherein the frame-accommodating lip of the first monolithic growing pod includes two or more perforated regions that are removable to mate the legs to the top portion of the frame assembly in the stepped or elevated array.

10. The modular gardening system of claim 1, further comprising:
a table assembly configured to be mated to the bottom portion of the frame assembly of two or more monolithic growing pods in a side-by-side array to raise the monolithic growing pods to a predetermined height; and
a user handrail coupled to the table assembly at a predetermined height.

11. The modular gardening system of claim 1, wherein the monolithic growing pods are made of a waterproof material.

12. The modular gardening system of claim 1, further comprising a grid-guide positioned on top of the plant growing medium and configured to demarcate a division of the first monolithic growing pod into four substantially equal quadrants.

13. The modular gardening system of claim 1, further comprising:
a drainage pipe operatively coupled to the first monolithic growing pod and the second monolithic growing pod, the drainage pipe fluidically coupling the first monolithic growing pod to the second monolithic growing pod.

14. The modular gardening system of claim 13, further comprising a drain field occupying at least part of the interior growing volume of the first monolithic growing pod, the drainage port positioned at a level of the drain field.

15. The modular gardening system of claim 14, wherein a porous material is disposed in the drain field, the porous material permeable to water and air and not permeable to the plant growing medium occupying the interior growing volume above the drain field.

16. The modular gardening system of claim 14, wherein a porous barrier divides the drain field and the part of the interior growing volume occupied by the plant growing medium.

17. The modular gardening system of claim 13, wherein in a side-by-side array, the drainage pipe couples a drainage port of the first monolithic growing pod to a drainage port of the second monolithic growing pod, and wherein in a stepped array the drainage pipe drains fluid from the drainage port of the first monolithic growing pod to a plant growing medium occupying at least part of the interior growing volume of the second monolithic growing pod.

18. The modular gardening system of claim 13, further comprising a drainage pipe fluidically coupling the second monolithic growing pod to a drainage collector.

19. A modular gardening system, comprising:
an array of two or more substantially identical monolithic growing pods, each monolithic growing pod including an opening to a growing volume defined by a frame-accommodating lip;
a frame assembly corresponding to each monolithic growing pod, wherein: a top portion of the frame assembly is configured to form a perimeter around the opening of the monolithic growing pod within the frame-accommodating lip;
a bottom portion of the frame assembly is substantially parallel to the top portion and configured to support the monolithic growing pod; and
a middle portion of the frame assembly includes two or more hollow pillars configured to join the top portion and the bottom portion, the hollow pillars each including a stopper positioned within the hollow pillar; and
a modular leg structure comprising a plurality of legs, the legs configured to be inserted into the hollow pillars to a position of the stopper and when mated to the bottom portion of the frame assembly, increasing a height of the monolithic growing pod and the legs, and when mated to the top portion of a first frame assembly and a bottom portion of a second frame assembly, forming a stepped array.

20. The modular gardening system of claim 19, further including a drainage pipe operatively coupled to a first monolithic growing pod and a second monolithic growing pod of the array of two or more substantially identical monolithic growing pods, the drainage pipe fluidically coupling the first monolithic growing pod to the second monolithic growing pod, and wherein in a side-by-side array, the drainage pipe couples a drainage port of the first monolithic growing pod to a drainage port of the second monolithic growing pod, and wherein in a stepped array the drainage pipe drains fluid from the drainage port of the first monolithic growing pod to a plant growing medium occupying at least part of the growing volume of the second monolithic growing pod.

* * * * *